United States Patent
Dings et al.

(10) Patent No.: US 11,416,347 B2
(45) Date of Patent: Aug. 16, 2022

(54) MAKING A BACKUP COPY OF DATA BEFORE REBUILDING DATA ON A NODE

(71) Applicant: Hewlett Packard Enterprise Development LP, Houston, TX (US)

(72) Inventors: Thomas Dings, Westborough, MA (US); Peter Madany, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 330 days.

(21) Appl. No.: 16/812,695

(22) Filed: Mar. 9, 2020

(65) Prior Publication Data

US 2021/0279145 A1    Sep. 9, 2021

(51) Int. Cl.
*G06F 12/00* (2006.01)
*G06F 11/14* (2006.01)
(Continued)

(52) U.S. Cl.
CPC ...... *G06F 11/1464* (2013.01); *G06F 11/0709* (2013.01); *G06F 11/1461* (2013.01);
(Continued)

(58) Field of Classification Search
CPC ............. G06F 11/1464; G06F 11/0709; G06F 11/1461; G06F 11/1469; G06F 16/273;
(Continued)

(56) References Cited

U.S. PATENT DOCUMENTS

| 8,074,107 B2 | 12/2011 | Sivasubramanian et al. |
| 2008/0052327 A1 | 2/2008 | Buah |
| 2008/0104443 A1* | 5/2008 | Akutsu ............... G06F 11/2074 714/6.12 |

FOREIGN PATENT DOCUMENTS

WO    WO-1998054660 A2    12/1998

OTHER PUBLICATIONS

Dell Inc., "Dell EMC SRDF: Introduction," <https://www.delltechnologies.com/asset/en-us/products/storage/technical-support/docu95482.pdf>. Sep. 2019, Rev. 01, pp. 1-108.
(Continued)

*Primary Examiner* — Shawn X Gu
(74) *Attorney, Agent, or Firm* — Jaffery Watson Mendonsa & Hamilton

(57) ABSTRACT

Architectures and mechanisms for rebuilding data on a node in a multimode system providing replicated data stores. A primary node provides a primary data store and a secondary node provides a replicated data store and replication to the second node occurs substantially synchronously during periods of normal operation for the second node. If the secondary node is available after a period of unavailability a copy of previously-replicated data on the secondary node is copied and stored when the secondary node is available after the period of unavailability before rebuilding of the secondary node to recover from the period of unavailability. The copy of the previously-replicated data can be used as a backup copy to the primary node during the rebuilding. The data on the secondary node is updated after the copy has been made. The updating comprises asynchronously writing data to the data on the secondary node. The secondary node synchronously replicates data from the primary node after the rebuilding.

20 Claims, 8 Drawing Sheets

(51) Int. Cl.
*G06F 16/27* (2019.01)
*G06F 11/07* (2006.01)

(52) U.S. Cl.
CPC ........ *G06F 11/1469* (2013.01); *G06F 16/273* (2019.01); *G06F 16/275* (2019.01)

(58) Field of Classification Search
CPC .... G06F 16/275; G06F 3/0646; G06F 3/0647; G06F 3/065
See application file for complete search history.

(56) References Cited

OTHER PUBLICATIONS

Rajeev Chaudhary, "Availability Groups Failover Scenarios," Jul. 11, 2015, pp. 1-8, Retrieved from the Internet on Nov. 5, 2019 at URL: <http://www.360sqldba.com/2015/07/availability-groups-failover-scenarios>.

Staimer, M., "Crash-consistent vs. application-consistent backups of virtual machines," https://web.archive.org/web/20160412073611/http://searchdatabackup.techtarget.com/answer/Crash-consistent-vs-application-consistent-backups-of-virtual-machines, Dec. 10, 2013, pp. 5. TechTarget.

Yacine Taleb et al., "Tailwind: Fast and Atomic RDMA-based Replication," USENIX ATC '18), Jul. 2018, pp. 1-14.

* cited by examiner

MAKING A BACKUP COPY OF DATA BEFORE REBUILDING DATA ON A NODE

BACKGROUND

Computing systems may store data. Data may be served via storage protocols. Computing systems may operate to store data with high or continuous availability. For example, data may be replicated between computing systems, and when restoring/rebuilding/resynching a failed system, data stores may need to be rebuilt.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
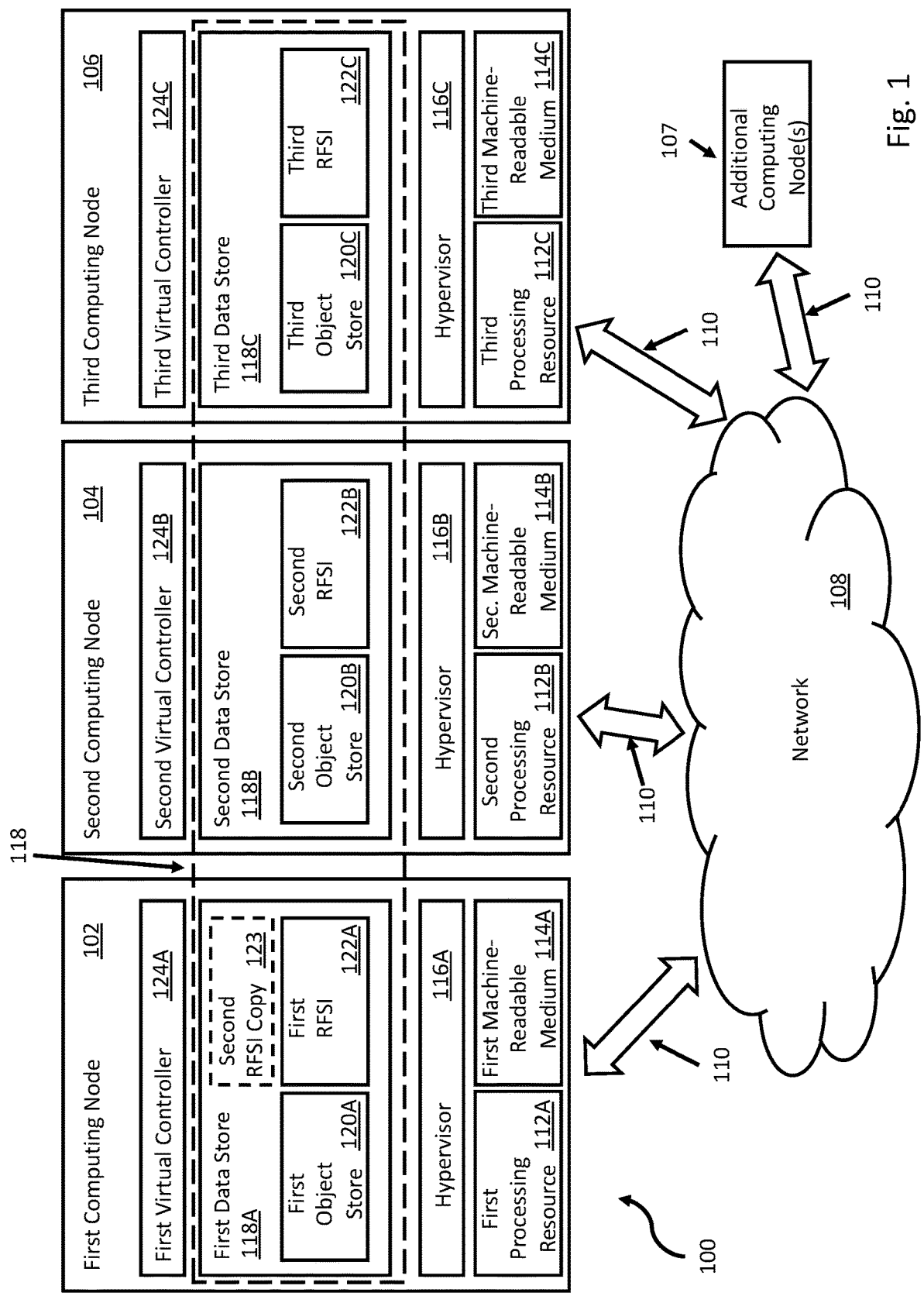
FIG. 1 is a block diagram of one embodiment of a cluster of computing nodes.

In the following description, numerous specific details are set forth. However, embodiments of the invention may be practiced without these specific details. In other instances, well-known structures and techniques have not been shown in detail in order not to obscure the understanding of this description.

Data may be stored on computing systems (hereinafter referred to as computing nodes), such as, but not limited to, servers, computer appliances, workstations, storage systems, or converged or hyperconverged systems. To store data, some computing nodes may utilize a data virtualization platform that abstracts, into data stores (e.g., a virtual or logical storage), aspects of a physical storage on which the data is physically stored (e.g., aspects such as addressing, configurations, etc.). The physical storage may be implemented using hardware, such as, hard disk drives, solid state drives, and the like. The data stores may be referenced by a user environment (e.g., to an operating system, applications, processes, etc.). The data virtualization platform may also provide data services such as deduplication, compression, replication, and the like.

In some implementations, a data store may be implemented, maintained, and managed, at least in part, by one or more virtual controllers. A virtual controller may be a virtual machine executing on hardware resources, such as a processor and memory, with specialized processor-executable instructions to establish and maintain the data store. In other implementations, the virtual controller may be implemented by other forms of virtualization, such as containers. In some instances, the data store may be an object-based data store.

In an object-based data store, data may be stored as objects in an object store. User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index. Objects in the object-based data store may be hierarchically related to a root object in an object tree (e.g., a Merkle tree) or any other hierarchical arrangement (e.g., directed acyclic graphs, etc.).

The hierarchical arrangement of objects may be referred to as a file system instance or a hive. In some instances, one or more file system instances may be dedicated to an entity, such as a particular virtual machine or virtual controller, a database, a user, or a client. Objects in the object store may be referenced in the one or more file system instances.

In order to provide high or continuous availability of data, computing nodes participating a virtualized distributed network may be arranged into failure domains. For example, a failure domain may be a cluster of computing nodes connected over a network. In some cases, a file system instance may be replicated between two or more computing nodes in the cluster. Occasionally, a computing node in the cluster may become unavailable to service client requests to access or update data.

Unavailability of the computing node may arise, for example, due to a network partition, a partial or complete failure of that computing node, a disconnection of that computing node from the network, or other situations. Therefore, it is desirable to maintain high-availability (HA) of the file system instance across at least two computing nodes in the cluster. In some examples, the file system instance corresponding to a virtual machine (VM), for example, may be stored in at least two computing nodes as replicas, for example, one replica of the file system instance may be stored locally on a computing node hosting the VM while another replica may be stored on a different computing node in the cluster.

In high availability (HA) environments, primary and secondary storage devices can be utilized to provide redundancy and backup capacity in the case of device failure, network failure, etc. Recovery from node failure can be based on three states: 1) "HA-compliant" (or HA sync) where both the primary and secondary node are available and current; 2) "HA-non-compliant, pre-rebuild" (or out of HA sync, and never tried to rebuild) where the primary node is available and current, and the secondary node needs to be rebuilt to be current; and 3) "HA-non-compliant, rebuilding" (or out of HA sync, and rebuild has started) where the primary node is available and current and the secondary node is being updated.

As used herein a "secondary node" is a node with a secondary replica of VM data. Similarly, a "primary node" is a node with the primary replica of the VM data. A node that needs to be rebuilt, or a node that is to be rebuilt, is a node that has been unavailable for a period of time and contains a replica file system instance (RFSI) of data that needs contains stale data that needs to be updated. Techniques for rebuilding nodes are provided below, (e.g., FIG. 7).

These three states can be utilized when the secondary node fails and the primary node continues to operate, but the VM data does not have a current secondary replica as a standby and is thus HA-non-compliant. These three states can also be utilized when the primary node fails and the secondary node is promoted to primary node, but does not have a current replica and is thus HA-non-compliant. Other situations may also exist in which the nodes are HA-non-compliant. The examples provided herein are generally described in terms of two nodes, but any number of nodes with a corresponding HA backup/replication structure can be supported. Further, the examples provided are in terms of data for a single VM, but any number of VMs can be supported.

It should be noted that a file system instance being HA-non-compliant is not the same as lacking a recent backup copy. Backup copies are based on points in time that have passed. HA-non-compliance, or lack thereof, is related to a file system instance being current, i.e. synchronized, with a primary file system instance. A backup copy can also be referred to as a snapshot.

As described herein, techniques and mechanisms can be provided to identify the time period immediately before recovery/rebuild for a replica on a node that was unavailable for a period of time. This is the "HA-non-compliant, pre-rebuild" state. In this state a crash-consistent backup copy is made of each replica to be rebuilt on the node to be rebuilt. Because the rebuilding process is based on LBA ordering, the replicas being rebuilt on the node cannot be used during the rebuild. Thus, during rebuild the backup copy of a replica would be usable to service requests to the node being rebuilt if a node with a VM data's primary replica becomes unavailable. This gives more current data than previous techniques such as, for example, roll back to a periodic backup copy. It can also result in less permanently lost data in the case of a catastrophic hardware failure if a node with a VM data's primary replica becomes unavailable during the rebuilding of its secondary replica.

Use of the newly made backup copy should not be confused with rebuilding from a failure of the secondary node. The newly made backup copy could be used, for example, if there is a loss of the primary node while the secondary node is being rebuilt. As described in greater detail below, in some embodiments, the rebuilding process is based on Logical Block Address (LBA) ordering rather than chronological ordering. Other non-chronological processes can be supported.

Chronological replication and rebuilding is generally based on a log file or similar structure in which actions are maintained in chronological order and replication or rebuilding is accomplished by starting at a known state and subsequent changes/actions can be applied to rolled back data. In non-chronological replication can be based on a different pattern, such as LBA. Utilizing the structures and mechanisms described herein with non-chronological replication and rebuilding, the resulting system can be more efficient and data loss can be reduced in the event of node failure, as compared to a chronological-based implementation.

FIG. 1 is a block diagram of one embodiment of a cluster of computing nodes. Cluster 100 can include first computing node 102, second computing node 104, and third computing node 106 (hereinafter collectively referred to as computing nodes 102-106) coupled to each other via network 108. For ease of explanation, FIG. 1 is described along with FIG. 2 which depicts sequence diagram 200 showing example interactions among computing nodes 102-106 in cluster 100 to maintain high-availability of the file system instance, in accordance with another example.

Although the present example of FIG. 1 refers to three computing nodes for convenience, the various aspects described herein are also applicable to network systems that include one or more additional nodes 107 and to network systems that include only two computing nodes (e.g., 102 and 104). Each of computing nodes 102-106 as well as any additional computing nodes such as computing node 107, may be a computer, a device including a processor or microcontroller and/or any other electronic component, or a device or system that performs one or more operations according to one or more programming instructions. Examples of computing nodes 102-106 and 107 may include, but are not limited to, a desktop computer, a laptop, a smartphone, a server, a computer appliance, a workstation, a storage system, or a converged or hyperconverged system, and the like.

Computing nodes 102-106 and 107 may be coupled to network 108 via communication links 110. Network 108 may refer to a medium that interconnects plurality of computing nodes. Examples of network 108 may include, but are not limited to, local area network (LAN), wireless LAN (WLAN), metropolitan area network (MAN), wide area network (WAN), and the Internet. Communication over network 108 may be performed in accordance with various communication protocols such as, but not limited to, Transmission Control Protocol and Internet Protocol (TCP/IP), User Datagram Protocol (UDP), IEEE 802.11n, and cellular communication protocols over communication links 110. Communication links 110 may be enabled via a wired (e.g., Ethernet, optical communication, etc.) or wireless (e.g., Wi-Fi®, cellular communication, satellite communication, etc.) communication technologies.

Further, in some implementations, each of computing nodes 102-106 and 107 may include a processing resource and a machine readable medium. For example, first computing node 102 may include first processing resource 112A, and first machine readable medium 114A. Similarly, second computing node 104 may include second processing resource 112B and second machine readable medium 114B. Also, third computing node 106 may include third processing resource 112C and third machine readable medium 114C.

Some features of first computing node 102 may be analogous in many respects to corresponding features of second and third computing nodes 104, 106. For example, first processing resource 112A and first machine readable medium 114A of first computing node 102 may be analogous, in terms of hardware and/or functionality, to processing resources 112B, 112C, machine readable media 114B, 114C.

Merely for clarity and convenience, features and components of first computing node 102 have been be prefixed with the term "first," features and components of second computing node 104 have been prefixed with the term "second," and features and components of third computing node 106 have been prefixed with the term "third," without connoting sequence. Features and components of first computing node 102 will now be described, and such description may also apply to analogous features and components of second computing node 104.

Non-limiting examples of first processing resource 112A may include a microcontroller, a microprocessor, central processing unit core(s), an application-specific integrated circuit (ASIC), a field programmable gate array (FPGA), etc. First machine readable medium 114A may be a non-transitory storage medium, examples of which include, but are not limited to, a random access memory (RAM), a read-only memory (ROM), an electrically erasable programmable read-only memory (EEPROM), a flash memory, a hard disk drive, etc. First processing resource 112A may execute instructions (i.e., programming or software code) stored on first machine readable medium 114A. Additionally or alternatively, first processing resource 112A may include electronic circuitry for performing the functionality described herein.

Further, first computing node 102 may include hypervisor 116A. Hypervisor 116A may be a computer program, firmware, or a hardware that may facilitate hosting of multiple operating system instances on a common processing resource. Each operating system instance installed on hypervisor 116A may be referred to as a virtual machine. Accordingly, hypervisor 116A may provide a host operating system for the virtual machine. Hypervisor 116A may be type-1 hypervisor (also referred to as "bare-metal hypervisor") or type-2 (also referred to as "hosted hypervisor"). The type-1 hypervisor may be installed on the hardware (e.g., processing resource 112A, machine readable medium 114A) of host computing node 102 without any intermediate operating system. The type-2 hypervisor may be installed on top of an operating system running on host computing node 102. Also, second computing node 104 and third computing node 106 may respectively include second hypervisor 116B and third hypervisor 116C.

Computing nodes 102, 104, and 106 may respectively include first data store 118A, second data store 118B, and third data store 118C (hereinafter collectively referred to as data stores 118A-118C). Data stores 118B and 118C may be representative of an example of data store 118A. Data stores 118A, 118B, and 118C may collectively form distributed data store 118 that can be accessible by computing nodes 102-106, 107. By way of example, data stores 118A-118C and therefore distributed storage 118 may represent a virtualized storage enabled by respective hypervisors 116A-116C and may include aspects (e.g., addressing, configurations, etc.) abstracted from data stored in a physical storage (not shown). Distributed storage 118 may be presented to a user environment (e.g., to the virtual machines, an operating system, applications, processes, etc.) hosted on one or more of computing nodes 102-106 and 107. In some examples, data stores 118A-118C may also provide data services such as deduplication, compression, replication, and the like.

Data stores 118A-118C may be object-based. For example, in data stores 118A-118C, data may be stored as objects. For example, data stores 118A, 118B, and 118C may include object stores 120A, 120B, and 120C, respectively. User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index.

In some examples, objects in data stores 118A-118C may be hierarchically arranged. Such hierarchical arrangement of the objects may be referred to as a file system instance or a hive. For illustration purposes, although there may be more, first data store 118A is shown to include one such file system instance—first replica file system instance (RFSI) 122A. Objects in first replica file system instance 122A may represent one or more objects stored in object store 120A.

One or more objects in given file system instance, e.g., 122A, may be related to a root object in an object tree (e.g., a Merkle tree) or any other hierarchical arrangement (e.g., directed acyclic graphs, etc.). In the case of the object tree, the lowest level tree node of any branch (that is, most distant from the root object) is a data object that stores user data, also referred to as a leaf data object.

The parent tree node of the leaf data objects is a leaf metadata object that stores, as its content, the signatures of its child leaf data objects. The root and internal nodes of the object tree may also be metadata objects that store as content the signatures of child objects. A metadata object may be able to store a number of signatures that is at least equal to a branching factor of the hierarchical tree, so that it may hold the signatures of all of its child objects. In some instances, file system instance 122A may be dedicated to an entity, such as a particular virtual machine or virtual controller, a user, or a client.

In some examples, to facilitate high-availability of the data, distributed storage 118 may also include one or more replicas of a given file system instance. For instance, a replica of file system instance 122A may be stored on second data store 118B in second computing node 104 as second replica file system instance (RFSI) 122B. More particularly, object stores 118A, 118B store the data whereas file system instances 122A, 122B may merely refer to trees which are formed by linking content of signatures of the objects stored respectively in data stores 118A, 118B. During normal operation, any update made in first replica file system instance 122A is also reflected in second replica file system instance 122B. Additional replica file system instances (e.g., RFSI 122C) can also be supported.

Although not shown, computing nodes 102-106 may also include several other file system instances dedicated to certain other virtual machines or databases and corresponding replica file system instances stored on different computing nodes in cluster 100. In some embodiments, datastores do not have different copies of the data. Rather, datastores can be virtual constructs that provide access to whichever underlying object stores have the primary copy of the data.

In some implementations, data stores 118A, 118B, and 118C may be implemented, maintained, and managed, at least in part, by one or more virtual controllers, such as, first virtual controller 124A, second virtual controller 124B, and third virtual controller 124C, respectively. By way of example, first virtual controller 124A may be implemented using hardware devices (e.g., electronic circuitry, logic, or processors) or any combination of hardware and programming (e.g., instructions stored on machine readable medium) to implement various functionalities described herein. For example, first virtual controller 124A may be a virtual machine that includes, at least in part, instructions stored on first machine readable medium 114A and executing on first processing resource 112A. Virtual controllers 124B and 124C may be representative of an example of first virtual controller 124A. Virtual controllers 124A, 124B, 124C may be hosted by hypervisors 116A, 116B, and 116C, respectively.

In the present configuration of cluster 100, even though two-way replication has been enabled by storing two replicas (122A, 122B) corresponding to a resource (e.g., a VM) in cluster 100, virtual controllers 124A, 124B, 124C may facilitate high-availability of data even in case of failure of a computing node (e.g., second computing node 104). In accordance with some aspects of the present disclosure, if a computing node such as second computing node 104 encounters a failure condition, virtual controller 124A may initiate process for rebuilding the replicated data to be consistent with the primary data in order for second computing node 104 to be fully recovered (i.e., rebuilt).

By way of example, such failure condition may include, but is not limited to, a separation of second computing node 104 from network 108, complete or partial failure, damage, and/or malfunctioning of second computing node 104 or any internal components thereof such as second virtual controller 124B, second processing resource 112B, and second machine readable medium 114B. In response to the detection of the failure condition, a VM with data replicated on second computing node 104 can be considered in a HA non-compliant state because the replicated (e.g., secondary) data maintained by second computing node 104 is either not available or not current.

As described in greater detail below, a crash-consistent backup copy of second RFSI 122B can be made (e.g., second RFSI copy 123) and stored, for example, in first data store 118A. The crash-consistent backup copy can be made during the HA-non-compliant, pre-rebuild stage. In alternate embodiments, second RFSI copy 123 can be stored in other locations, for example, third data store 118C (not illustrated in FIG. 1).

Figure 2:
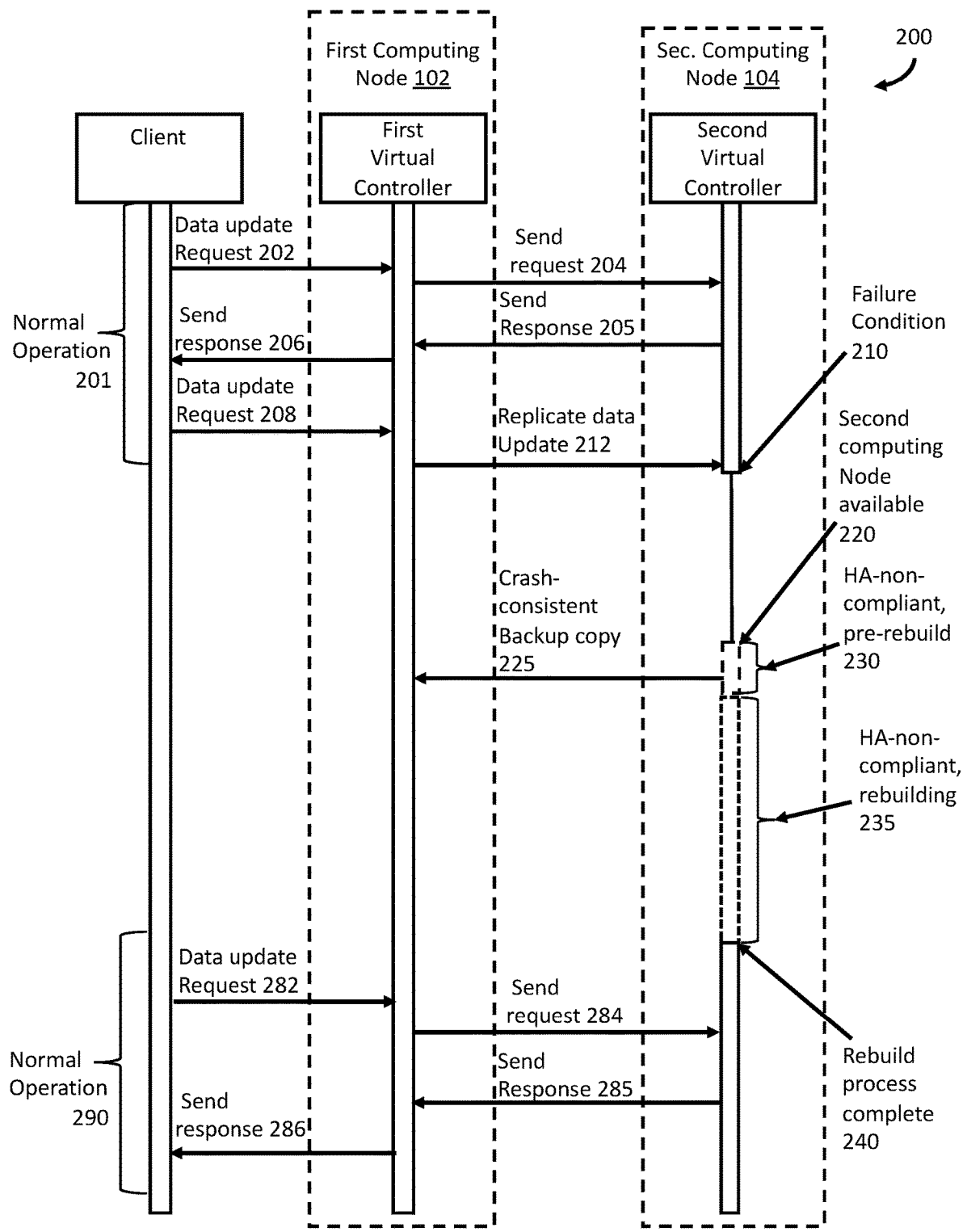
FIG. 2 is a sequence diagram depicting example interactions among the computing nodes in the cluster of FIG. 1 to maintain high-availability of a file system instance.

FIG. 2 is a sequence diagram depicting example interactions among the computing nodes in the cluster of FIG. 1 to maintain high-availability of a file system instance. Bracket 201 indicates sequence of interactions between computing nodes 102-104 during normal operation of cluster 100. During normal operation 201, at 202, a data update request may be received by first virtual controller 124A from a client such as hypervisor 116A. For example, the data update request may be a request to update data corresponding to a resource hosted on first computing node 102, such as a VM or a database. By way of example, the data update request may include, but is not limited to, a data write request, a file creation request, a file deletion request, a file rename request, a file movement request, or combinations thereof.

Depending on particulars of the first data update request, first virtual controller 124A may perform the requested update in first data store 118A. For example, an update may be performed on first replica file system instance 122A by first virtual controller 124A. Moreover, to facilitate HA of data, first virtual controller 124A may also send the first data update request to second computing node 104 at 204.

In particular, first virtual controller 124A may perform same update in the second replica file system instance 122B as performed on first replica file system instance 122A. By doing so, first virtual controller 124A maintains replicas of a file system instance as first replica file system instance 122A stored on first computing node 102 and second replica file system instance 122B stored on second computing node 104. Once the update is successfully performed on second replica file system instance 122B, second virtual controller 124B, at 205, may send a response to first virtual controller 124A indicating the such successful completion of data update corresponding to the first data update request.

Further, once the updates are successfully performed on both first replica file system instance 122A and second replica file system instance 122B, first virtual controller 124A may send a response indicating the completion of data update corresponding to the first data update request to client at 206. Normal operation state 201 corresponds to the HA compliant state because the primary data source (e.g., first replica file system instance 122A) is fully replicated to the secondary data source (e.g., second replica file system instance 122B), or the replication process is proceeding as expected.

During operation, second computing node 104 hosting second replica file system instance 122B may encounter a failure condition at 210. In some examples, in a failure detection phase, first virtual controller 124A may detect such failure condition associated with second computing node 104 while serving second data update request previously received at 208. For instance, at 212, as per a normal routine for replicating a data update on second replica file system instance 122B, first virtual controller 124A may discover that second computing node 104 has failed (i.e., encountered the failure condition). In an example, first virtual controller 124A may determine that second computing node 104 has failed due to absence of any acknowledgement (in a predefined time duration) from second virtual controller 124B for second data update request sent by first virtual controller 124A.

Due to the failure condition associated with second computing node 104, no data update can be performed in second data store 118B to update second replica file system instance 122B. As a consequence of detecting the failure condition at 210, second replica file system instance 122B can be considered in an HA non-compliant state. Second computing node 104 is unavailable for a period of time and then becomes available again at 220. As discussed above, there can be multiple HA non-compliant states, for example, HA-non-compliant, pre-rebuild (230) and HA-non-compliant, rebuilding (235).

Various events can occur during pre-rebuild stage 230. At least one event that occurs is a crash-consistent backup copy of second replica file system instance 122B is made prior to data being accepted to rebuild second replica file system instance 122B. In some embodiments, the backup copy can be stored on the first node during the rebuild process. In other embodiments, the backup copy can be stored in other locations, for example, the second node, or a third node. In one embodiment the crash-consistent backup copy is made (225) by second virtual controller 124B. In some embodiments, the backup copy can be requested by first virtual controller 124A. An indication of the existence of the backup copy is sent to first computing 102 and to third computing node 106, more specifically to first virtual controller 124A and third virtual controller 124C.

The rebuilding process can include rebuilding more than just the second replica file system instance on second computing node 104; however, the discussion will focus mainly on the rebuilding of the file system, which occurs during rebuild stage 235. During rebuild stage 235, the backup copy of second replica file system instance 122B can be used, for example, if the first (primary) node fails.

In some embodiments, replication to the replica file system instance on the second computing node 104 is performed in a non-chronological order. In these embodiments, the file system of second computing node 104 cannot be used as a secondary source during the rebuilding process. In some embodiments, this non-chronological order is logical block address (LBA) order. In alternate embodiments, non-LBA, non-chronological ordering can be utilized. When the rebuild process completes (240), normal operation 290 can resume.

Returning to normal operation 290, update request 282 can be received by first computing node 102 and, to facilitate HA of data, first virtual controller 124A may also send the data update request to second computing node 104 at 284. Once the update is successfully performed on second replica file system instance 122B, second virtual controller 124B, at 285, may send a response to first virtual controller 124A indicating the such successful completion of data update corresponding to the first data update request.

Once the updates are successfully performed on both first replica file system instance 122A and second replica file system instance 122B, first virtual controller 124A may send a response indicating the completion of data update corresponding to the first data update request to client at 286.

Figure 3:
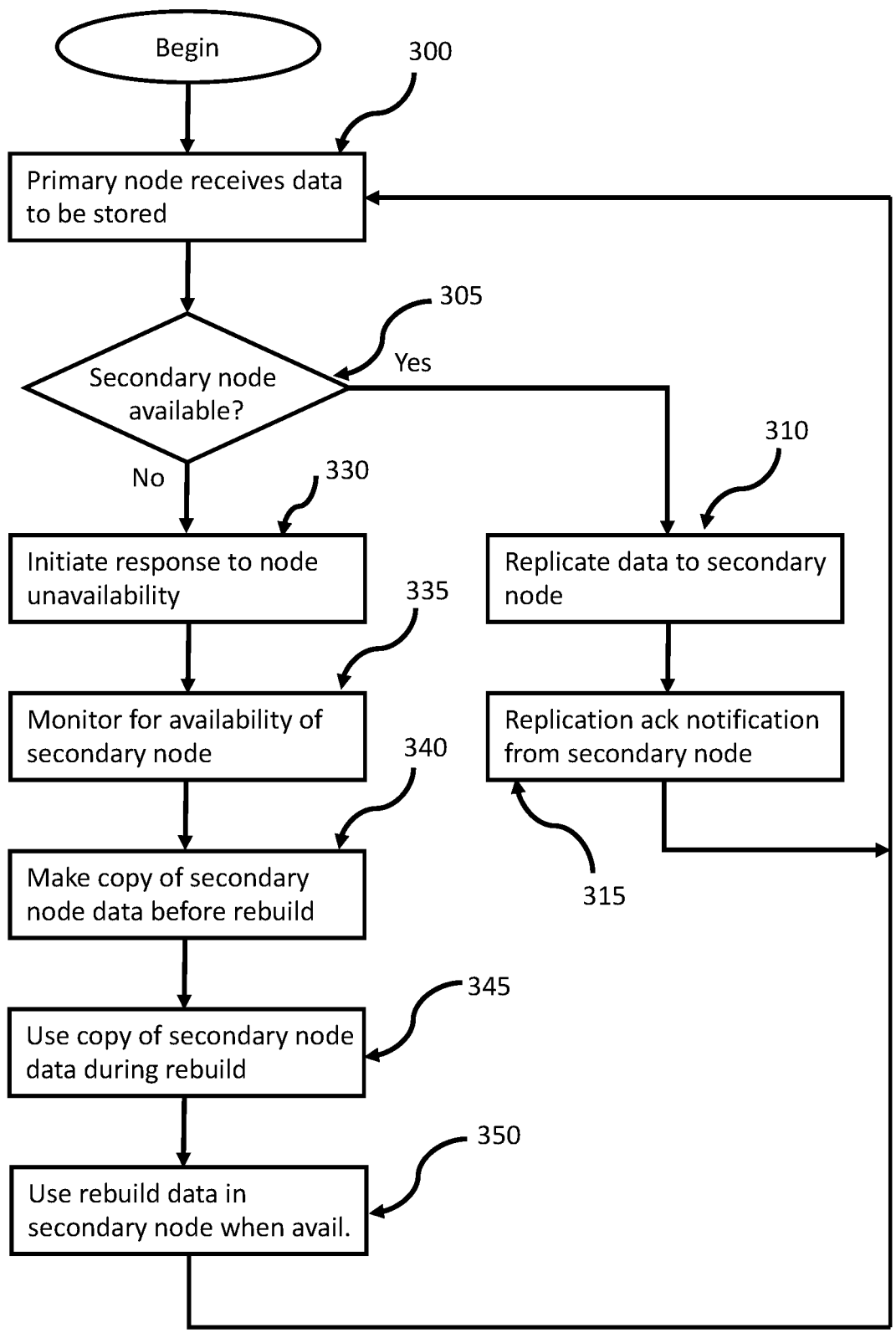
FIG. 3 is a flow diagram of one embodiment of a rebuild process that can be utilized in an HA environment.

FIG. 3 is a flow diagram of an overview of one embodiment of a rebuild process that can be utilized in an HA environment. The example of FIG. 3 is provided in terms of two nodes, primary and secondary; however, the concepts described are applicable to any number of nodes. More detailed description of various aspects of node operation is provided below.

The primary node receives data to be stored, 300. By way of example, the data to be stored can come from an operation or request handled by the primary node which can include, but is not limited to, a data write request, a file creation request, a file deletion request, a file rename request, a file movement request, or combinations thereof.

As part of handling the request in an HA environment, the primary node can perform functions that indicate whether the secondary node is available, 305. For example, the primary node can send a ping or other type of request to the secondary node to explicitly check whether the secondary node is available. In other embodiments, the primary node can send data to the secondary node and receive a response indicating the secondary node is not available or receive no response and, after a threshold period of time, assume that the secondary node is not available.

If the secondary node is available, 305, data from the primary node can be replicated to the secondary node, 310. The secondary node can generate/transmit an acknowledge notification that can be received by the primary node and/or other nodes, 315.

If the secondary node is not available, 305, a response to node unavailability can be initiated, 330. The response can include actions and responses in addition to those described herein including, for example, notifications, restarting of one or more components, etc. One or more components can monitor for availability of the secondary node, 335. This monitoring can be active or passive and various techniques can be utilized to determine whether the secondary node is available again.

When the secondary node is available again, 335, a copy of the data replicated to the secondary node is made. That is, when the secondary node is in the HA-non-compliant, pre-rebuild state, a crash-consistent backup of the previously replicated data can be made on the secondary node. Information regarding this copy can be provided to one or more other nodes.

While the secondary node is being rebuilt, if the primary node becomes unavailable, the backup copy on the secondary node can be used in lieu of the primary replica on the primary node, 345. That is, when the secondary node is in the HA-non-compliant, rebuilding state, the secondary replica is not usable if the primary node becomes unavailable. Once the secondary node has been rebuilt it can be used for normal operation, 350, as described above.

Figure 4:
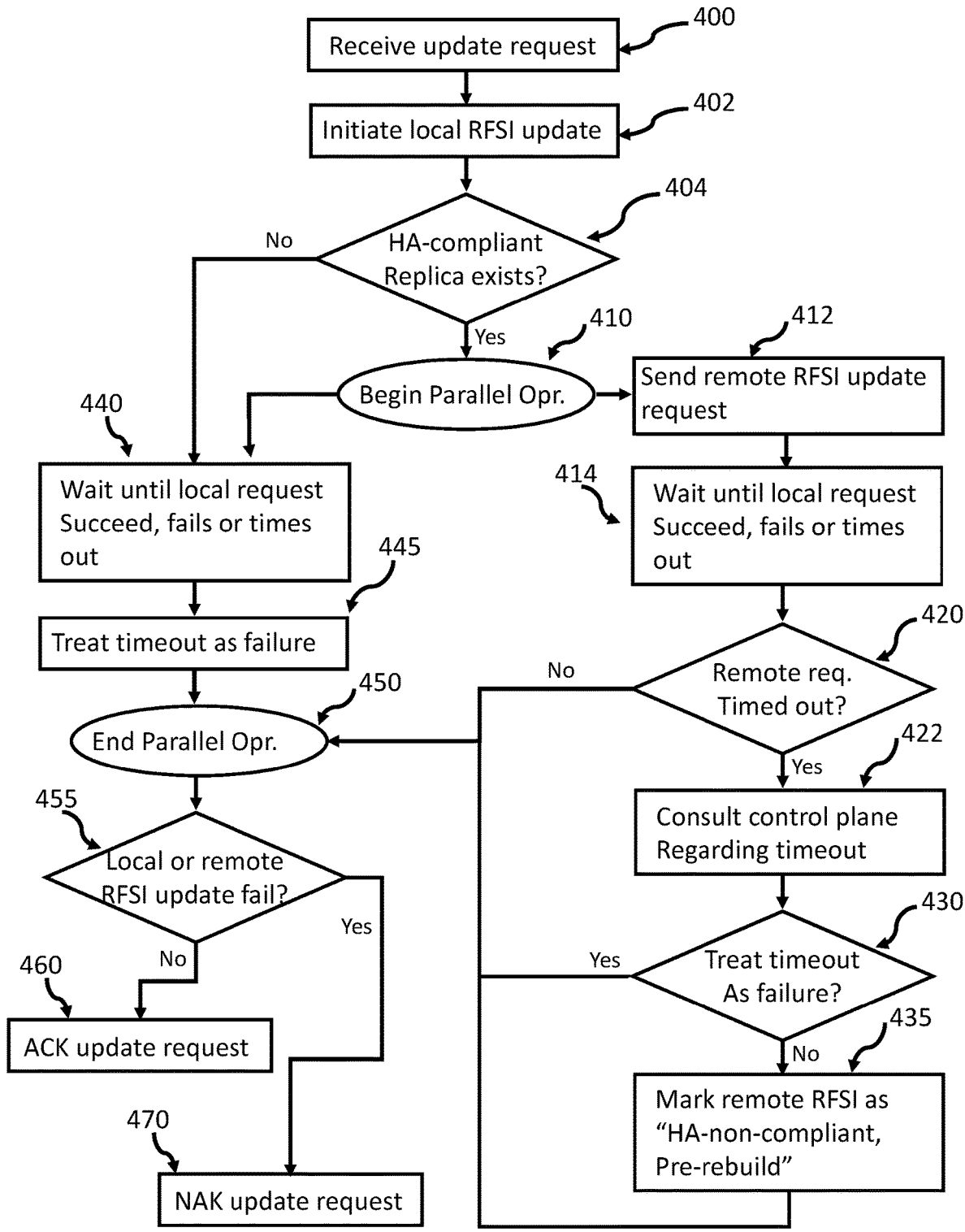
FIG. 4 is a flow diagram of one embodiment of a technique to handle writes in cluster of computing nodes both when the primary node and the secondary node are initially HA-compliant and HA-non-compliant.

FIG. 4 is a flow diagram of one embodiment of a technique to handle writes in cluster of computing nodes whether the primary node and the secondary node are initially HA-compliant or not. The primary node (e.g., first computing node 102) receives an update request, 400, and in response, initiates a local RFSI (e.g., first RFSI 122A) update, 402.

If an HA compliant replica exists, 404, parallel operation can begin 410. If an HA compliant replica does not exist, 404, the primary node waits until the local request succeeds, fails or times out, 440, and a timeout result can be treated as a failure, 445. At this point parallel operation, if any, can end, 450. If the local or remote RFSI update failed, 455, a NAK (negative acknowledgment) response for the update request is generated, 470. If neither the local nor any remote RFSI update fails, 455, an ACK (acknowledgment) response for the update request is generated, 460.

If the HA compliant replica exists, 404, and parallel operation begins, 410, the primary node can send a remote RFSI update request to the secondary node, 412. The primary node can wait for the remote request to succeed, fail or timeout, 414. If the remote request does not time out, 420, parallel operation will end, 450. If the local or remote RFSI update failed, 455, a NAK response for the update request is generated, 470. If neither the local nor remote RFSI update fails, 455, an ACK response for the update request is generated, 460.

If the remote request times out, 420, the primary node can consult the control plane regarding the timeout, 422. Various details regarding the control plane interaction are provided in greater detail below. If the failure is to be treated as a timeout failure, 430, parallel operation, if any, will end 450. If the local or remote RFSI update failed, 455, a NAK response for the update request is generated, 470. If neither the local nor remote RFSI update fails, 455, an ACK response for the update request is generated, 460.

If the failure condition is not to be treated as a timeout failure, 430, the remote RFSI is marked as being in the "HA-non-compliant, pre-rebuild" state, 435. Parallel operation, if any, can end, 450. If the local or remote RFSI update failed, 455, a NAK response for the update request is generated, 470. If neither the local nor remote RFSI update fails, 455, an ACK response for the update request is generated, 460.

Figure 5:
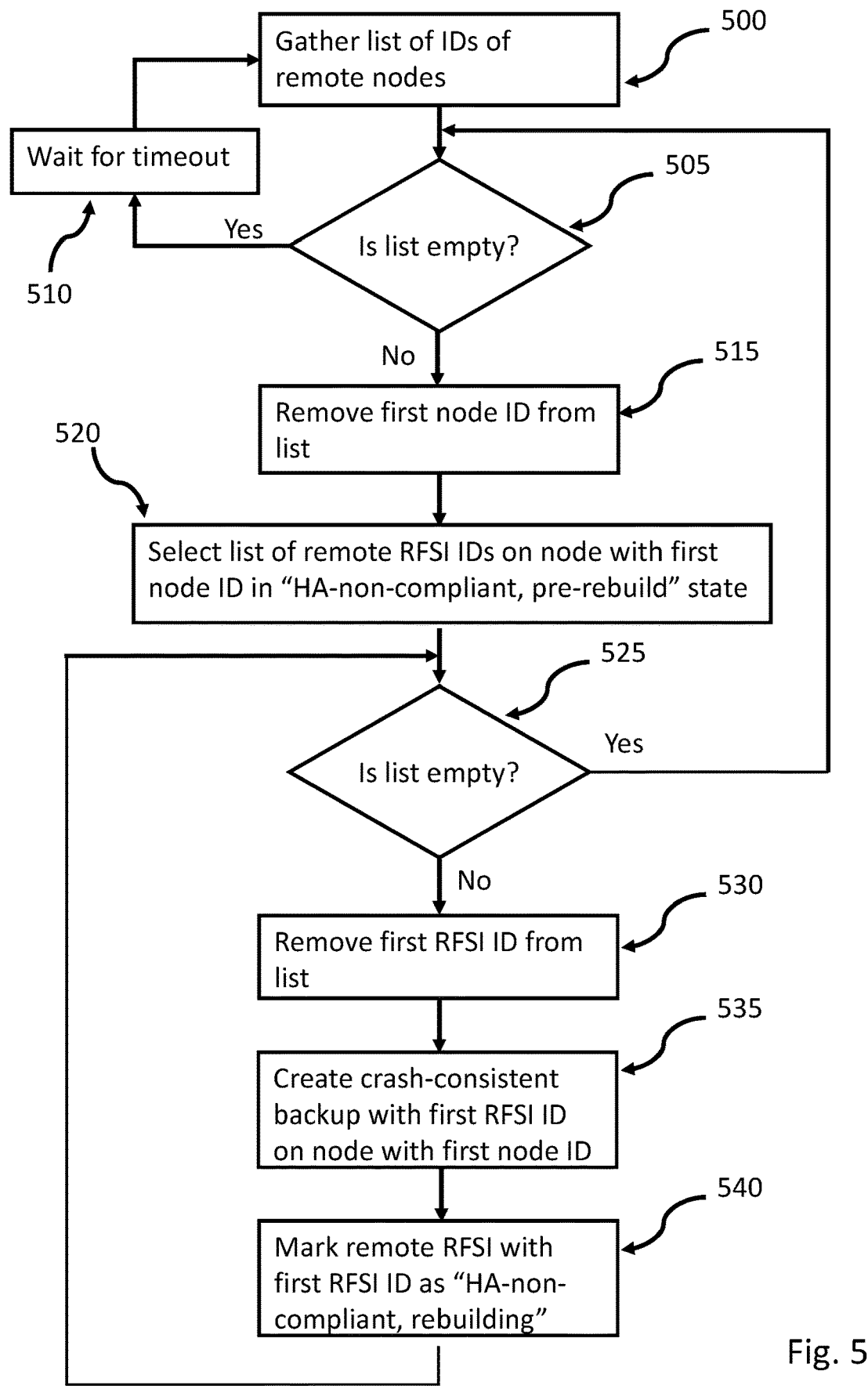
FIG. 5 is a flow diagram of one embodiment of a technique to manage aspects of rebuilding of a node in a cluster of computing nodes.

FIG. 5 is a flow diagram of one embodiment of a technique to manage aspects of rebuilding of a node in a cluster of computing nodes. In some embodiments, the functionality of FIG. 5 is provided by the control plane of the cluster of computing nodes.

A list of IDs for remote nodes that have become available is selected (or maintained, or received), 500. If the list of available nodes is empty, 505, no rebuilds are currently necessary and the system waits for a timeout, 510. If the list of unavailable nodes is not empty, 505, a first node ID is removed from the list, 515.

A list of remote RFSI IDs on the node with the first node ID is processed for remote RFSIs that are in the "HA-non-compliant, pre-rebuild" state, 520. If the list of remote RFSI IDs on the node with the first node ID in "HA-non-complaint, pre-rebuild" is empty, 525, the process can return to processing of remote nodes that have recently become available, 500/505. If the HA-non-compliant, pre-rebuild list is not empty, 525, a first RFSI ID is removed from that list, 530. A crash-consistent backup of the remote RFSI with the first RFSI ID on the node with the first node ID can be created, 535. The remote RFSI with the first RFSI ID is then marked as "HA-non-compliant, rebuilding", 540, and the process can repeat as necessary.

Figure 6:
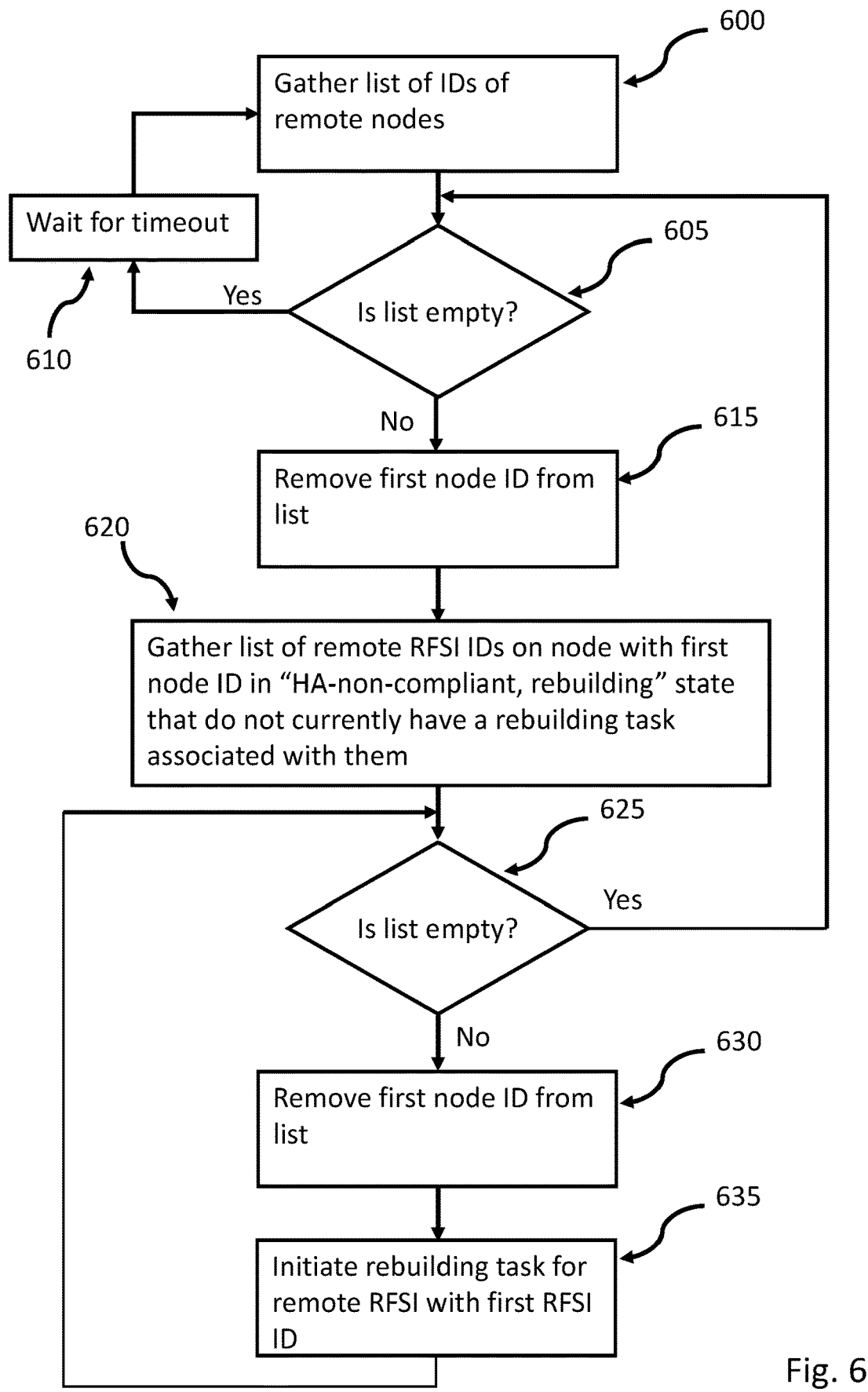
FIG. 6 is a flow diagram of one embodiment of a technique to manage aspects of rebuilding of a node in a cluster of computing nodes.

FIG. 6 is a flow diagram of one embodiment of a technique to manage aspects of rebuilding of a node in a cluster of computing nodes. In some embodiments, the functionality of FIG. 6 is provided by the control plane of the cluster of computing nodes.

A list of IDs for remote nodes is gathered, 600. If the list of nodes is empty, 605, no rebuilds are currently necessary and the system waits for a timeout, 610. If the list of nodes is not empty, 605, a first node ID is removed from the list, 615.

A list is gathered of remote RFSI IDs on the node with the first node ID is in the "HA-non-compliant, rebuilding" state that do not currently have a rebuilding task associated with them, 620. If that list of RFSI IDs is empty, 625, the process can return to processing of remote nodes, 600/605. If the HA-non-compliant, rebuilding list is not empty, 625, a first RFSI ID is removed from that list, 630. A rebuilding task for the remote RFSI with the first RFSI ID can be initiated, 635, and the process can repeat as necessary. In some embodiments, the number of concurrent rebuilding tasks may be limited to manage the control plane's resource utilization.

Figure 7:
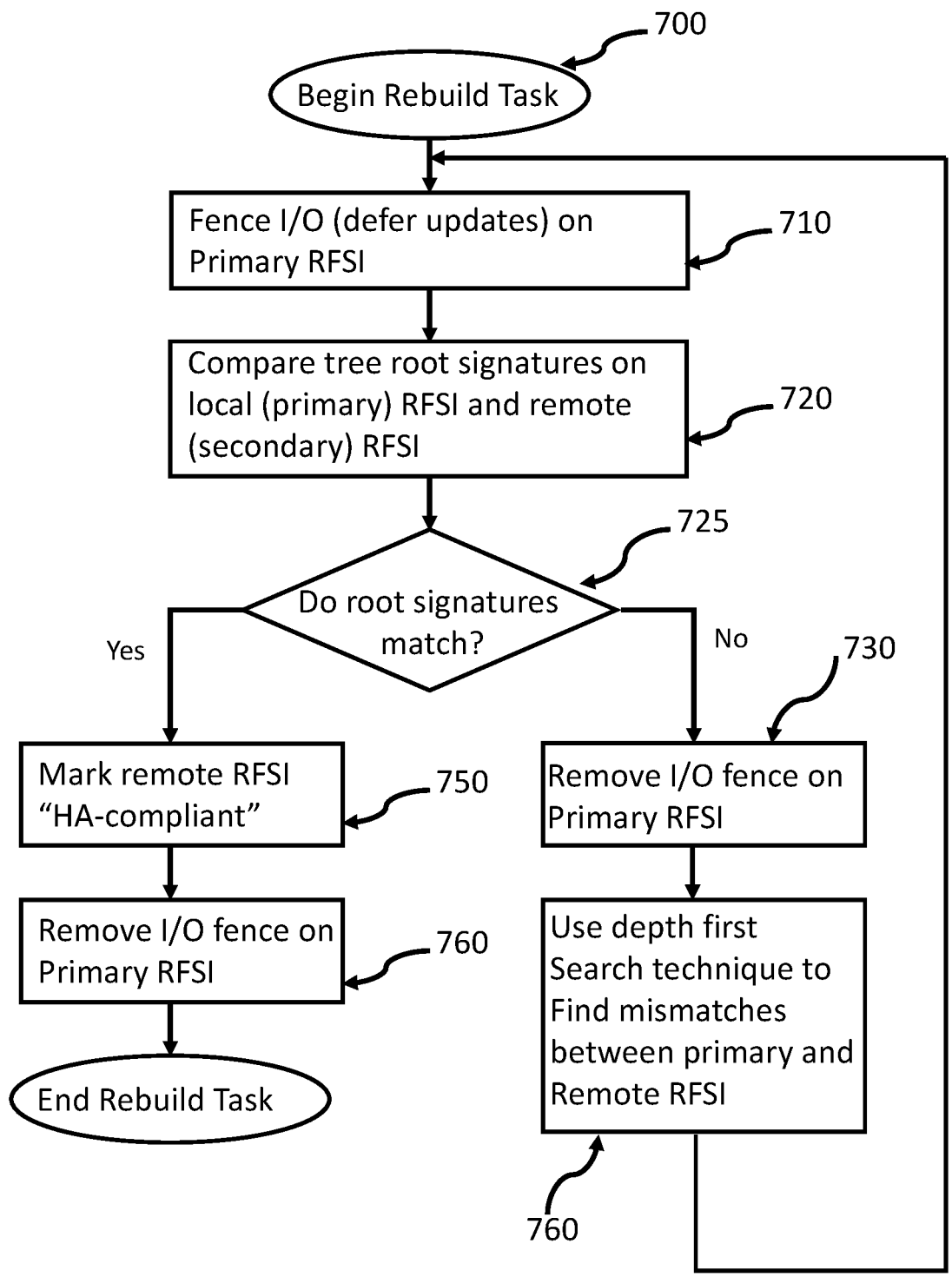
FIG. 7 is a flow diagram of one embodiment of a technique for managing a rebuilding task.

FIG. 7 is a flow diagram of one embodiment of a technique for managing a rebuilding task. In some embodiments, the functionality of FIG. 7 is provided by the control plane of the cluster of computing nodes.

The node rebuild task fences I/O operations (i.e., defers updates), 710. The tree root signatures on the local (primary) RFSI and the remote (secondary) RFSI are compared, 720. If the root signatures match, 725, the remote RFSI is marked "HA-compliant", 750 and the I/O fence is removed on the primary RFSI, 760. In some embodiments, when the I/O fence is removed on the primary RFSI, any pending I/O operations can function as described in FIG. 4.

If the root signatures do not match, 725, the I/O fence is removed on the primary RFSI, 730, and a depth first search technique can be used to find mismatches between the primary RFSI and the remote RFSI, 740. Other search techniques can also be utilized. Mismatched data is copied from the primary node to the secondary node and persisted. The process can then repeat as necessary.

Figure 8:
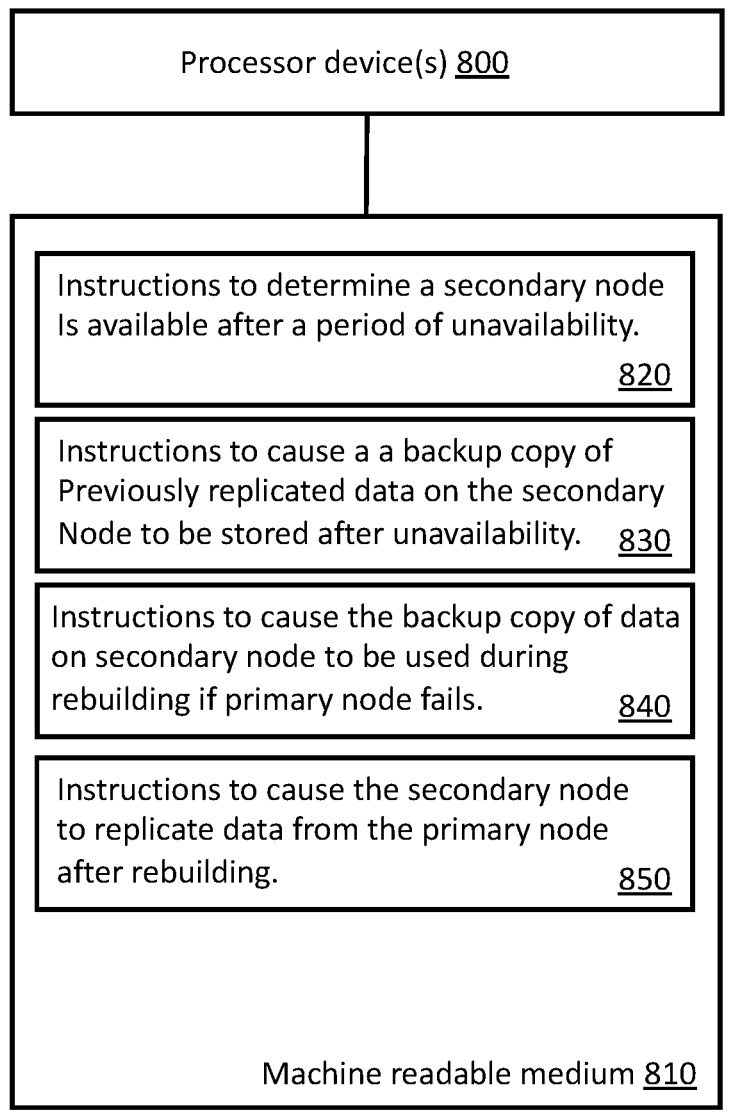
FIG. 8 is a block diagram of one embodiment of a processing resource and a machine readable medium encoded with example instructions to maintain high-availability of a file system.

FIG. 8 is a block diagram of one embodiment of a processing resource and a machine readable medium encoded with example instructions to maintain high-availability of a file system. Machine readable medium 810 is non-transitory and is alternatively referred to as a non-transitory machine readable medium 810. In some examples, the machine readable medium 810 may be accessed by processor device(s) 800. Processor device(s) 800 and machine readable medium 810 may be included in computing nodes, such as the computing nodes 102-106, of the cluster 100. By way of example, processor device(s) 800 may serve as or form part of the processing resources 112A, 112B, and/or 112C. Similarly, the machine readable medium 810 may serve as or form part of the machine-readable media 114A, 114B, and/or 114C.

Machine readable medium 810 may be encoded with example instructions 820, 830, 840 and 850. Instructions 820, 830, 840 and 850, when executed by the processor device(s) 800, may implement various aspects of maintaining high-availability of a file system described herein.

In some embodiments, instructions 820 cause one or more components to determine that the secondary node is available after a period of unavailability. As discussed above, this determination may be active (i.e., actively checking the status of the secondary node) or passive (i.e., being notified that the secondary node is unavailable). In response to the secondary node becoming available after a period of unavailability, instructions 830 can cause one or more components to create a backup copy of data on the secondary node before the secondary node is rebuilt as part of the recovery process from being unavailable for a period of time.

During the rebuilding process, instructions 840 can cause the backup copy of data on the secondary node to be used in lieu of data from the primary node in cases where the primary node fails during rebuilding. After the rebuilding process has completed, instructions 850 can cause the secondary node to again replicate data from the primary node as before the period of unavailability.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system.

The term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computing network comprising:
a first node comprising at least a first data storage device to store a first set of data;
a second node communicatively coupled with the first node, the second node comprising at least a second data storage device to store a second set of data, wherein the second set of data is a synchronously replicated copy of the first set of data;
a control plane communicatively coupled with the first node and with the second node, the control plane to determine when the second node is available after a period of unavailability, and to make a backup copy of data on the second data storage device after the second node becomes available after the period of unavailability and before rebuilding the data stored on the second data storage device to replicate data stored on the first data storage device, wherein replication to the second node occurs substantially synchronously during periods of normal operation for the second node and replication to the second node occurs asynchronously during the rebuilding.

2. The computing network of claim 1 wherein the backup copy of data on the second data storage device after the second node becomes available after the period of unavailability and before rebuilding the data stored on the second data storage device to replicate data stored on the first data storage device comprises a crash-consistent copy of the second set of data.

3. The computing network of claim 1 wherein the rebuilding the data stored on the second data storage device is performed in a non-chronological order, the non-chronological write order comprises a logical block address (LBA) order.

4. The computing network of claim 1 wherein the first node requests that the second data storage device store the backup copy of data on the second data storage device after the second node becomes available after the period of unavailability and before rebuilding the data stored on the second data storage device to replicate data stored on the first data storage device.

5. The computing network of claim 1 wherein the control plane comprises at least a virtual controller to at least detect availability and unavailability of the second node.

6. The computing network of claim 5 wherein the virtual controller further functions to detect availability and unavailability of the first node and, in response to unavailability of the first node, causes the second node to service requests directed to the first node.

7. A computer-implemented method comprising:
 determining that a secondary node is available after a period of unavailability, wherein the secondary node functions at least to replicate data from a primary node with which the secondary node is communicatively coupled, wherein replication to the second node occurs substantially synchronously during periods of normal operation for the second node;
 storing a copy of previously-replicated data on the secondary node when the secondary node is available after the period of unavailability before rebuilding of the secondary node to recover from the period of unavailability;
 causing the copy of the previously-replicated data to be used as a backup copy to the primary node during the rebuilding;
 rebuilding the data on the secondary node after the copy has been made, wherein the rebuilding comprises asynchronously writing data to the data on the secondary node; and
 causing the secondary node to synchronously replicate data from the primary node after the rebuilding.

8. The computer-implemented method of claim 7 wherein the backup copy of data on the second data storage device after the second node becomes available after the period of unavailability and before rebuilding the data stored on the second data storage device to replicate data stored on the first data storage device comprises a crash-consistent copy of the second set of data.

9. The computer-implemented method of claim 7 wherein the rebuilding of data from the primary node to the secondary node is performed in a non-chronological order.

10. The computer-implemented method of claim 9 wherein the non-chronological order comprises a logical block address (LBA) order.

11. The computer-implemented method of claim 7 wherein the functionality is provided by a control plane that comprises at least a virtual controller to at least detect availability and unavailability of the secondary node.

12. The computer-implemented method of claim 11 wherein the virtual controller further functions to detect availability and unavailability of the primary node and, in response to unavailability of the primary node, causes the secondary node to service requests directed to the primary node.

13. The computer-implemented method of claim 7 wherein the unavailability of the secondary node results from failure of all or a portion of the secondary node.

14. The computer-implemented method of claim 7 wherein the unavailability of the secondary node results from a network connectivity failure.

15. A non-transitory computer-readable medium having stored thereon instructions that, when executed by one or more processors, are configurable to cause the one or more processors to:
 determine that a secondary node is available after a period of unavailability, wherein the secondary node functions at least to replicate data from a primary node with which the secondary node is communicatively coupled, wherein replication to the second node occurs substantially synchronously during periods of normal operation for the second node;
 store a copy of previously-replicated data from the secondary node when the secondary node is available after the period of unavailability before rebuilding of the secondary node to recover from the period of unavailability;
 cause the copy of the previously-replicated data to be used as a backup copy to the primary node during the rebuilding;
 rebuild the data on the secondary node after the copy has been made, wherein the rebuilding comprises asynchronously writing data to the data on the secondary node; and
 cause the secondary node to synchronously replicate data from the primary node after the rebuilding.

16. The non-transitory computer-readable medium of claim 15 wherein the backup copy of data on the second data storage device after the second node becomes available after the period of unavailability and before rebuilding the data stored on the second data storage device to replicate data stored on the first data storage device comprises a crash-consistent copy of the second set of data.

17. The non-transitory computer-readable medium of claim 15 wherein the replication of data from the primary node to the secondary node is performed in a non-chronological order.

18. The non-transitory computer-readable medium of claim 17 wherein the non-chronological write order comprises a logical block address (LBA) order.

19. The non-transitory computer-readable medium of claim 15 wherein the functionality is provided by a control plane that comprises at least a virtual controller to at least detect availability and unavailability of the secondary node.

20. The non-transitory computer-readable medium of claim 15 wherein the unavailability of the secondary node results from failure of all or a portion of the secondary node.

* * * * *